(12) United States Patent
Ishijima (10) Patent No.: US 7,542,267 B2
(45) Date of Patent: Jun. 2, 2009

(54) LEAD FRAME, METHOD OF MANUFACTURING A FACE-DOWN TERMINAL SOLID ELECTROLYTIC CAPACITOR USING THE LEAD FRAME, AND FACE-DOWN TERMINAL SOLID ELECTROLYTIC CAPACITOR MANUFACTURED BY THE METHOD

(75) Inventor: Masami Ishijima, Sendai (JP)

(73) Assignee: NEC TOKIN Corporation, Sendai-shi (JP)

(*) Notice: Subject to any disclaimer, the term of this patent is extended or adjusted under 35 U.S.C. 154(b) by 228 days.

(21) Appl. No.: 11/593,217

(22) Filed: Nov. 6, 2006

(65) Prior Publication Data

US 2008/0106854 A1 May 8, 2008

(51) Int. Cl.
*H01G 9/00* (2006.01)
(52) U.S. Cl. .............. 361/523; 361/525; 361/528; 361/529; 361/516; 361/519; 29/25.01; 29/25.03
(58) Field of Classification Search ........... 361/523, 361/525, 528, 516–519, 531, 532, 533, 529, 361/534; 29/25.01, 25.03
See application file for complete search history.

(56) References Cited

U.S. PATENT DOCUMENTS

| 6,236,561 | B1* | 5/2001 | Ogino et al. ............ 361/523 |
| 6,262,878 | B1* | 7/2001 | Shirashige et al. ....... 361/508 |
| 6,816,358 | B2* | 11/2004 | Kida et al. .............. 361/540 |
| 6,819,546 | B2* | 11/2004 | Kuriyama .............. 361/535 |
| 6,891,717 | B2* | 5/2005 | Fujii et al. ............. 361/523 |
| 6,903,922 | B2* | 6/2005 | Sano et al. ............. 361/533 |
| 6,975,503 | B2 | 12/2005 | Abe et al. |
| 7,110,245 | B2* | 9/2006 | Ishida et al. ........... 361/538 |
| 2004/0125542 | A1 | 7/2004 | Fujii et al. |
| 2006/0126273 | A1 | 6/2006 | Ishijima |

FOREIGN PATENT DOCUMENTS

| JP | 2003-133177 A | 5/2003 |
| JP | 2004-349270 A | 12/2004 |
| JP | 2005-197457 A | 7/2005 |
| JP | 2006-190965 A | 7/2006 |

OTHER PUBLICATIONS

Korean Office Action (and English Translation) dated Jan. 31, 2008, issued in counterpart Korean Application No. 10-2006-109374.

* cited by examiner

*Primary Examiner*—Nguyen T Ha
(74) *Attorney, Agent, or Firm*—Frishauf, Holtz, Goodman & Chick, P.C.

(57) ABSTRACT

In a lead frame for use in fabricating a face-down terminal solid electrolytic capacitor having a capacitor element an anode terminal, and a cathode terminal, a frame body has a connecting portion for being connected to the capacitor element. The connecting portion extends from a cathode terminal forming portion in a first direction to a position near an anode terminal forming portion. The anode terminal forming portion is connected to the frame body and used for forming the anode terminal. The cathode terminal forming portion is connected to the frame body and used for forming the cathode terminal. The anode terminal forming and the cathode terminal forming portions are spaced to each other in the first direction on a principal surface of the frame body.

20 Claims, 5 Drawing Sheets

LEAD FRAME, METHOD OF MANUFACTURING A FACE-DOWN TERMINAL SOLID ELECTROLYTIC CAPACITOR USING THE LEAD FRAME, AND FACE-DOWN TERMINAL SOLID ELECTROLYTIC CAPACITOR MANUFACTURED BY THE METHOD

BACKGROUND OF THE INVENTION

This invention mainly relates to a lead frame for use in fabrication of a solid electrolytic capacitor of a facedown terminal type (hereinafter referred to as a "face-down terminal solid electrolytic capacitor") having electrodes directly drawn out or led out to a board mount side and further relates to a method of manufacturing a face-down terminal solid electrolytic capacitor using the lead frame and a face-down terminal solid electrolytic capacitor manufactured by the method.

Solid electrolytic capacitors using tantalum, niobium, or the like as a valve-action metal are small in size, large in capacitance, and excellent in frequency characteristic and, therefore, have been widely used, for example, in decoupling circuits and power supply circuits of CPUS. With the recent development of portable electronic devices, commercialization is increasingly made of a face-down terminal solid electrolytic capacitor having electrodes directly drawn out to a board mount side and having a small ESR (equivalent series resistance) and a small ESL (inductance component) of the entire capacitor particularly in a high frequency band.

Such a face-down terminal solid electrolytic capacitor is disclosed, for example, in Japanese Unexamined Patent Application Publication (JP-A) No. 2003-133177 (Patent Document 1). The capacitor is manufactured as follows. A case is prepared which includes an anode portion and a cathode portion facing each other and having lower ends connected to each other by a coupling portion. A capacitor element is disposed between the anode and the cathode portions so as to be electrically connected thereto. After covering an area between the anode and the cathode portions with a synthetic resin, the coupling portion is ground or removed to electrically separate the anode and the cathode portions from each other and to expose parts of the anode and the cathode portions that are adapted to be faced to a circuit board.

Another face-down terminal solid electrolytic capacitor is disclosed, for example, in Japanese Unexamined Patent Application Publication (JP-A) No. 2004-349270 (Patent Document 2). In the capacitor, cathode exposed portions exposed from a casing resin are provided at least two positions on the same plane with respect to a cathode terminal.

However, the above-mentioned face-down terminal solid electrolytic capacitors are disadvantageous in electrode terminal structure. Specifically, a current path distance between the anode and the cathode or a conducting path distance from the capacitor element to the circuit board is considerably long. Further, the skin depth decreases in a high frequency band. Therefore, the ESR (equivalent series resistance) and the ESL (inductance component) of the entire capacitor remarkably increase. Thus, it is not possible to achieve sufficiently low values of ESR and ESL of the entire capacitor.

SUMMARY OF THE INVENTION

It is therefore an object of this invention to provide a lead frame capable of reducing a current path distance between an anode and a cathode so as to achieve sufficiently low values of ESR and ESL of an entire capacitor.

It is another object of this invention to provide a method of manufacturing a face-down terminal solid electrolytic capacitor using the above-mentioned lead frame.

It is still another object of this invention to provide a face-down terminal solid electrolytic capacitor manufactured by the above-mentioned method.

According to an aspect of the present invention, there is provided a lead frame for use in fabricating a face-down terminal solid electrolytic capacitor having a capacitor element, an anode terminal, and a cathode terminal, the lead frame comprising a frame body extending in a first direction; an anode terminal forming portion connected to the frame body for forming the anode terminal; and a cathode terminal forming portion connected to the frame body for forming the cathode terminal, the anode terminal forming and the cathode terminal forming portions being spaced from each other in the first direction on a principal surface of the frame body, wherein the frame body comprises a connecting portion for being connected to the capacitor element, the connecting portion extending from the cathode terminal forming portion in the first direction to a position near the anode terminal forming portion.

The above-mentioned lead frame may be configured so that the connecting portion defines a connection range to be electrically connected to the capacitor element placed between the anode terminal forming and the cathode terminal forming portions.

The above-mentioned lead frame may be configured so that the solid electrolytic capacitor has a connection end face and an anode lead led out from the connection end face and that the anode terminal forming portion is adapted to be connected to the anode lead.

The above-mentioned lead frame may be configured so that the connecting portion extends from the cathode terminal forming portion to a position near a reference plane which is along the connection end face.

The above-mentioned lead frame may be configured so that the connection range extends from the cathode terminal forming portion to a reference plane which is along the connection end face.

The above-mentioned lead frame may be configured so that the anode terminal forming portion is formed as a deformation portion which is protruded from the principal surface in a second direction perpendicular to the principal surface to have a concave surface and a convex surface opposite to the concave surface.

In the above-mentioned lead frame, the concave surface may be plated.

The above-mentioned lead frame may be configured so that the convex surface comprises a flat portion parallel to the principal surface and an inclined portion continuous from the flat portion to be away from the cathode terminal forming portion in the first direction and that the inclined portion is inclined so as to approach the principal surface.

According to the basic structure of the lead frame as described above, the current path between the anode and the cathode becomes short so that the ESR and the ESL of the entire capacitor have sufficiently low values.

In the above-mentioned lead frame, the deformation portion may be formed by a drawing or a reducing process.

In the above-mentioned lead frame, the deformation portion may be formed by a coining process.

The above-mentioned lead frame may be configured so that the concave surface is of a polygonal shape in a section parallel to the principal surface.

The above-mentioned lead frame may be configured so that the concave surface is of a shape with at least one rectilinear side in a section parallel to the principal surface.

With such a shape of the concave surface, cutting for separating a chip body from the lead frame is facilitated. Herein, the chip body represents a main body of the face-down terminal solid electrolytic capacitor, which is connected to the lead frame and subjected to cutting.

The above-mentioned lead frame may be configured so that the deformation portion has a projecting portion formed away from the principal surface and outwardly extending in a third direction perpendicular to the first and the second directions.

The above-mentioned lead frame may be configured so that the deformation portion has a recessed portion formed away from the principal surface and inwardly extending in a third direction perpendicular to the first and the second directions.

By providing the convex surface with the projecting portions or the recessed portions in this manner, the projecting portions or the recessed portions serve as anchors to the casing resin so that the fixing strength is enhanced.

In the above-mentioned lead frame, each of the anode terminal forming and the cathode terminal forming portions may be provided with films containing at least one of Ag, Au, Cu, Pd, and Sn.

In the above-mentioned lead frame, each of the anode terminal forming and the cathode terminal forming portions may be provided, on its surfaces in a direction perpendicular to the principal surface, with films containing at least one of Ag, Au, Cu, Pd, and Sn in order to form the anode terminal and the cathode terminal, respectively.

By providing each of the anode terminal forming portion and the cathode terminal forming portion with the film containing at least one of Ag, Au, Cu, Pd, and Sn in this manner, the bonding force with a solder or the like at the interface increases.

With respect to a current path particularly in a high frequency band, a skin depth $\delta$ is given by $\delta=(\rho/\pi f\mu)^{1/2}$, where $\rho$ represents a resistivity, f, a frequency, and $\mu$, a permeability. According to this equation, a surface current path of the depth of several tens of $\mu m$ or less has an influence due to the skin effect in a high frequency band. Therefore, in order to reduce the ESL, it would be a best approach to adopt a structure plated with Au having a low resistivity $\rho$. Further, if the anode terminal and the cathode terminal in the thickness direction as part of the current path between the anode and the cathode are cut in order to arrange the shape, cutting is preferably carried out in the manner such that the plated surfaces remain at the concave surfaces of the electrode terminal forming portions (the anode terminal forming portion and the cathode terminal forming portion). Thus, the ESL can be reduced.

According to this invention, there is also provided a method of manufacturing a face-down terminal solid electrolytic capacitor, the method comprising preparing the lead frame mentioned above; preparing a capacitor element having an anode lead; bonding the capacitor element to the lead frame; overmolding the capacitor element and the lead frame with a casing resin; and cutting the lead frame, the anode lead, and the casing resin, thereby forming an outer surface to serve as a side surface of the solid electrolytic capacitor.

The above-mentioned method may be configured so that the anode terminal forming and the cathode terminal forming portions have plated surfaces and the cutting is carried out along one of the plated surfaces while leaving the one of plated surfaces.

The above-mentioned method may further comprise applying, before the bonding, an insulating resin to a part of the anode terminal forming portion.

According to this invention, there is also provided a face-down terminal solid electrolytic capacitor manufactured by the method mentioned above, wherein the capacitor element comprises a dielectric layer, an electrolyte layer, and a cathode layer successively formed on a surface of a porous sintered body made of a valve-action metal and having the anode lead drawn out therefrom; the anode terminal is formed at the anode terminal forming portion having one end connected to the anode lead and the other end serving as an external connection terminal; the cathode terminal is formed at the cathode terminal forming portion having one end connected to the cathode layer of the capacitor element and the other end serving as an external connection terminal; the casing resin covers the capacitor element and being arranged so that each of the anode terminal and the cathode terminal has exposed surfaces on a mount surface with respect to a board and an outer side surface substantially perpendicular to the mount surface.

Also in the above-mentioned facedown terminal solid electrolytic capacitor, the structure of the lead frame is improved. Therefore, the current path between the anode and the cathode becomes short so that the ESR and the ESL of the entire capacitor have sufficiently low values. Therefore, excellent reliability is assured.

DESCRIPTION OF THE PREFERRED EMBODIMENT

In order to facilitate understanding of this invention, description will first be made of a basic structure of a facedown terminal solid electrolytic capacitor as a background technique preceding this invention. Face-down terminal solid electrolytic capacitors of this type have been suggested by the present assignee in Japanese Unexamined Patent Application Publication (JP-A) No. 2005-197457 (corresp. to U.S. Pat. No. 6,975,503 B2), Japanese Unexamined Patent Application Publication (JP-A) No. 2006-190965 (corresp. to US 2006/0126273 A1), and so on.

Figure 1A:
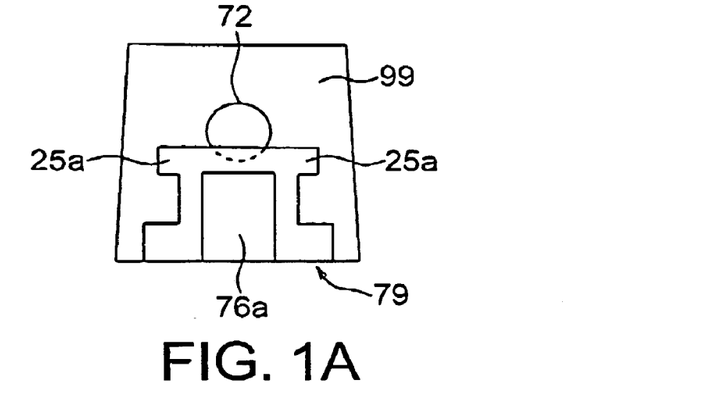
FIG. 1A is a side view for describing a basic structure of a face-down terminal solid electrolytic capacitor as a background technique preceding this invention, as seen from an anode side.
Figure 1B:
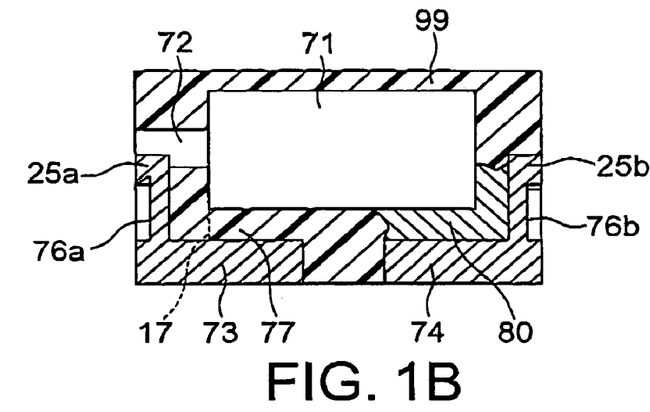
FIG. 1B is a sectional front view of the capacitor in FIG. 1A in the state where a casing resin is partly removed to show the inside of the capacitor.
Figure 1C:
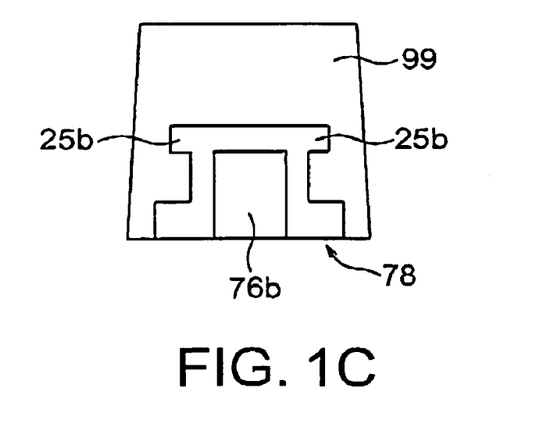
FIG. 1C is a side view of the capacitor as seen from a cathode side.

Referring to FIGS. 1A to 1C, the face-down terminal solid electrolytic capacitor comprises a capacitor element 71 having a dielectric layer, an electrolyte layer, and a cathode layer successively formed on a surface of a porous sintered body made of a valve-action metal, and an anode lead 72 drawn out from the capacitor element 71. A lead frame 200 has an anode terminal forming portion 81 and a cathode terminal forming portion 82. By applying the lead frame 200 to the capacitor element 71, a face-down anode terminal 73 having one end connected to the anode lead 72 and the other end serving as an external connection terminal is formed at the anode terminal forming portion 81, and a face-down cathode terminal 74 having one end connected to the cathode layer of the capacitor element 71 and the other end serving as an external connection terminal is formed at the cathode terminal forming portion 82. Further, a casing resin 99 is overmolded so as to cover the capacitor element 71 and to make each of the anode terminal 73 and the cathode terminal 74 have exposed surfaces at a mount surface to be mounted to a board and an outer side surface substantially perpendicular to the mount surface.

Herein, the anode terminal 73 is formed at the anode terminal forming portion 81 that is partly coated with an insulating resin 77 in advance. The cathode terminal 74 is formed at the cathode terminal forming portion 82 so as to be connected to the capacitor element 71 by the use of a conductive adhesive 80. An anode-side fillet surface 76a having been subjected to plating is exposed on the anode side and a cathode-side fillet surface 76b having been subjected to plating is exposed on the cathode side.

FIG. 1A shows a generally U-shaped anode terminal cut surface 79, FIG. 1C shows a cathode terminal cut surface 78, and FIG. 1B shows the state where one surfaces of concave surfaces having plated inner surfaces serve as the anode-side fillet surface 76a and the cathode-side fillet surface 76b at one end face and the other end face in the longitudinal direction, respectively. Anode-side projecting portions 25a exposed on one end face in the longitudinal direction and cathode-side projecting portions 25b exposed on the other end face are provided as terminals for obtaining an anchor effect into the casing resin 99.

Figure 2:
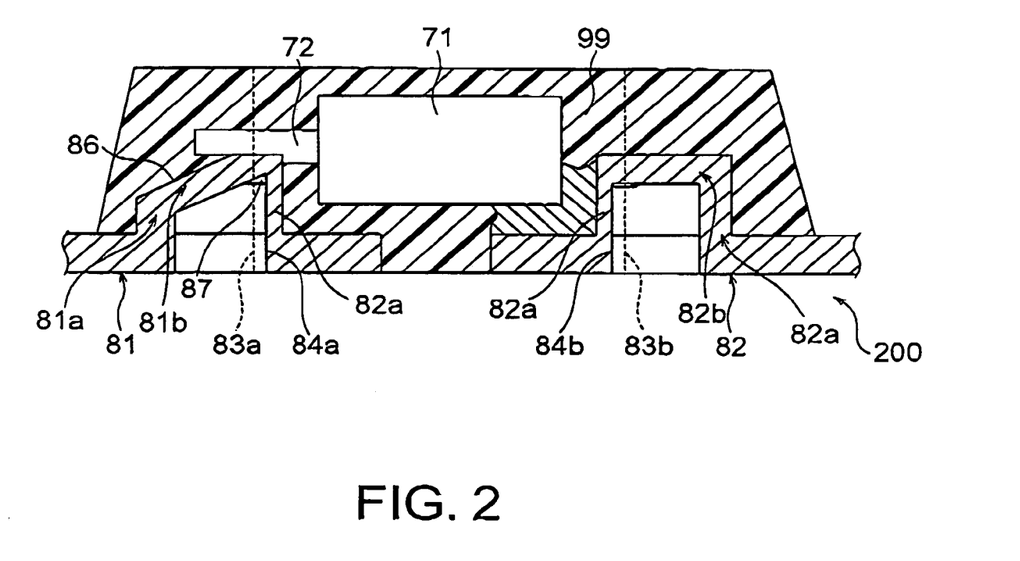
FIG. 2 is a sectional front view showing an intermediate stage of production of the capacitor illustrated in FIGS. 1A to 1C in the state where a capacitor element is bonded to a lead frame.

Referring to FIG. 2, the capacitor element 71 is bonded to a lead frame 200 for use in producing the face-down terminal solid electrolytic capacitor. The lead frame 200 and the capacitor element 71 are overmolded with the casing resin 99. Thus, the illustrated structure is in an intermediate stage of production before a cutting process.

Now, a manufacturing process of the above-mentioned face-down terminal solid electrolytic capacitor will be described. At first, the lead frame 200 having a predetermined plate-frame shape is formed.

In the lead frame 200, an anode bonding portion includes the anode terminal forming portion 81 (thick-line region) for forming the anode terminal 73 and is continuous from the anode terminal forming portion 81 to ensure connection between the anode terminal 73 and the anode lead 72. The anode bonding portion of the lead frame 200 is deformed by a drawing or a crushing or coining process in a direction perpendicular to the mount surface and in a direction different therefrom, thereby forming an anode terminal deformation portion. The deformation portion has a concave surface S1 on the mount surface side and a convex surface S2 opposite to the mount surface (as a profile of the anode bonding portion in the lead frame 200 as seen from the mount surface side and the side opposite to the mount surface, respectively). The deformation portion has a pair of perpendicular portions 81a extending in the direction perpendicular to the mount surface with an anode-side cutting plane 83a interposed therebetween and a bridging portion 81b connecting the perpendicular portions 81a. The bridging portion 81b is provided with a flat portion 87 that is parallel to the mount surface and serves as a welding margin and with an inclined portion 86 that is continuous from the flat portion 87 and inclined so as to approach the mount surface away from the flat portion 87. Accordingly, a series of the above-mentioned steps may be called inclination processing of the anode terminal deformation portion. The reason why the anode bonding portion for forming the anode terminal forming portion 81 has the inclined portion 86 inclined to approach the mount surface as the bridging portion 81b is away from the flat portion 87 is as follows. With the above-mentioned structure, upon resistance welding with the anode lead 72, welding points are located inside a cut plane. By presence of the inclined portion 86, the welding points are concentrated to a target position.

Likewise, in the lead frame 200, a cathode bonding portion includes the cathode terminal forming portion 82 (thick line region) for forming the cathode terminal 74 and is continuous from the cathode terminal forming portion 82. The cathode bonding portion of the lead frame 200 is deformed by a drawing or a crushing process in the direction perpendicular to the mount surface and in a direction different therefrom, thereby forming a cathode terminal deformation portion. The deformation portion has a concave surface S1 on the mount surface side and a convex surface S2 opposite to the mount surface (as a profile of the cathode bonding portion in the lead frame 200 as seen from the mount surface side and the side opposite to the mount surface, respectively). The deformation portion has a pair of perpendicular portions 82a extending in the direction perpendicular to the mount surface with a cathode-side cutting plane 83b interposed therebetween and a bridging portion 82b extending in parallel to the mount surface and connecting the perpendicular portions 82a. A combination of the inclination processing of the anode terminal deformation portion and the processing of the cathode terminal deformation portion may collectively be called deformation processing for electrode terminal formation.

Thereafter, the lead frame 200 is plated including the concave surfaces S1 and the capacitor element 71 is fixedly bonded to the lead frame 200. Further, after overmolding with the casing resin 99, the casing resin 99 and the lead frame 200 are cut along the anode-side cutting plane 83a and the cathode-side cutting plane 83b (located outside an anode-side fillet surface concave portion 84a and a cathode-side fillet surface concave portion 84b).

In order to save cost, plating may be carried out before the formation of the lead frame 200 in case where a plating layer remains after the formation of the lead frame and the deformation processing for electrode terminal formation.

In any event, in the state where the capacitor element 71 is bonded to the lead frame 200 and overmolded with the casing resin 99, the anode terminal forming portion 81 and the cathode terminal forming portion 82 are formed. By carrying out the cutting along the anode-side cutting plane 83a and the cathode-side cutting plane 83b to obtain a chip, the anode-side fillet surface concave portion 84a and the cathode-side fillet surface concave portion 84b serve as the fillet surfaces after the cutting. Herein, by providing the plated concave surfaces in the anode terminal forming portion 81 and the cathode terminal forming portion 82, the process of carrying out the plating after the cutting becomes unnecessary.

Referring to FIG. 1B, according to the background technique described above, the cathode terminal 74 and the capacitor element 71 are connected to each other by the use of the conductive adhesive 80 in a connection range existing only in a cathode-side area with respect to a reference plane 17. Herein, the reference plane 17 is given by a connection end face of the capacitor element 71 where the anode lead 72 is embedded. The cathode terminal 74 is connected by the conductive adhesive 80 so as to be partly exposed at the mount surface in correspondence to the connection range existing in the cathode-side area (in other words, the cathode terminal 74 does not exist near the reference plane 17 and is not exposed at the mount surface near the reference plane 17). With this structure, the current path distance between the anode and the cathode is increased so that the ESR and the ESL of the entire capacitor are increased in a high frequency band.

That is, in each of the face-down terminal solid electrolytic capacitors as the background technique proposed by the present assignee, the current path from the capacitor element 71 to the circuit board becomes long due to the electrode terminal structure. Further, the skin depth is small in the high frequency band. Therefore, the ESR and the ESL of the entire capacitor become large like in case of Patent Document 1 and Patent Document 2.

Hereinbelow, a lead frame of this invention, a method of manufacturing a facedown terminal solid electrolytic capacitor using the lead frame, and a face-down terminal solid electrolytic capacitor manufactured by the method will be described in detail in connection with a preferred embodiment.

Figure 3A:
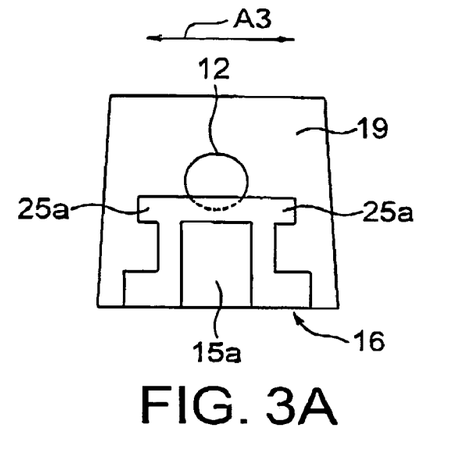
FIG. 3A is a side view for describing a basic structure of a face-down terminal solid electrolytic capacitor according to an embodiment of this invention, as seen from an anode side.
Figure 3B:
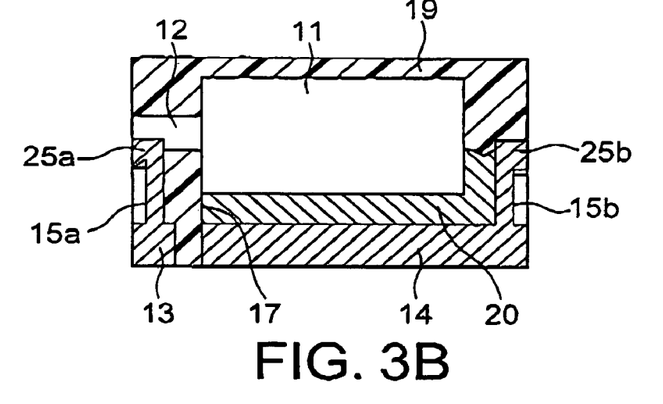
FIG. 3B is a sectional front view of the capacitor in FIG. 3A in the state where a casing resin is partly removed to show the inside of the capacitor.
Figure 3C:
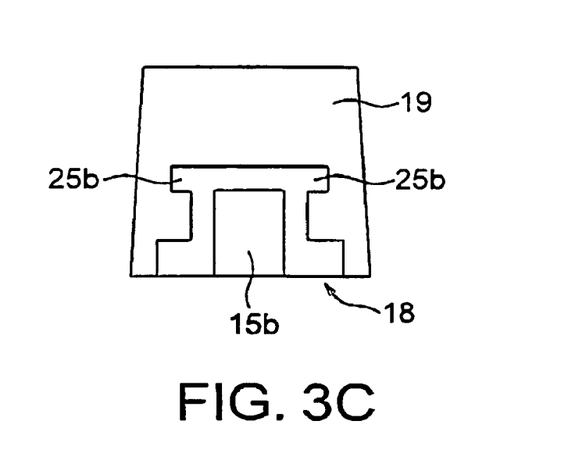
FIG. 3C is a side view of the capacitor as seen from a cathode side.

Referring to FIGS. 3A to 3C, the face-down terminal solid electrolytic capacitor according to this embodiment comprises a capacitor element 11 having a dielectric layer, an electrolyte layer, and a cathode layer successively formed on a surface of a porous sintered body made of a valve-action metal, and an anode lead 12 drawn out from the capacitor element 11. By applying a lead frame 100 (which will later be described in detail) to the capacitor element 11, a face-down anode terminal 13 and a face-down cathode terminal 14 are formed. The facedown anode terminal 13 has one end connected to the anode lead 12 and the other end serving as an external connection terminal. The face-down cathode terminal 14 has one end connected to the cathode layer of the capacitor element 11 and the other end serving as an external connection terminal. Further, a casing resin 19 is overmolded so as to cover the capacitor element 11 and to make each of the anode terminal 13 and the cathode terminal 14 have exposed surfaces at a mount surface, namely, a lower surface to be mounted to a board and an outer side surface substantially perpendicular to the mount surface. The above-mentioned structure is similar to that of the background technique. However, in this embodiment, the cathode terminal 14 and the capacitor element 11 are connected to each other by the use of a conductive adhesive 20 in a connection range extending from a cathode-side portion to a reference plane 17. Herein, the reference plane 17 is given by a connection end face 113 of the capacitor element 11 where an anode lead is embedded. It is noted here that the connection range may extend over a slightly shorter distance, i.e., from the cathode-side portion to a position before the reference plane 17 as far as the connection range is located near the reference plane 17.

By the use of the improved lead frame 100, the face-down terminal solid electrolytic capacitor according to the embodiment is configured so that the cathode terminal 14 is connected by the conductive adhesive 20 so as to be entirely (or partly) exposed at the mount surface in correspondence to the connection range extending from the cathode-side portion to the reference plane 17.

The anode terminal 13 is formed at the anode terminal forming portion (preferably, the anode terminal forming portion is partly coated with an insulating resin in advance). The cathode terminal 14 is formed at the cathode terminal forming portion so as to be connected to the capacitor element 11 by the use of the conductive adhesive 20. A fillet surface 15a having been subjected to plating is exposed on the anode side and a fillet surface 15b having been subjected to plating is exposed on the cathode side.

FIG. 3A shows a generally U-shaped anode terminal cut surface 16, FIG. 3C shows a cathode terminal cut surface 18, and FIG. 3B shows the state where the anode-side fillet surface 15a and the cathode-side fillet surface 15b are formed at one end face and the other end face of the solid electrolytic capacitor in the longitudinal direction, respectively. Anode-side projecting portions 25a exposed on one end face in the longitudinal direction and cathode-side projecting portions 25b exposed on the other end face are provided as terminals for obtaining an anchor effect into the casing resin 19.

Figure 4:
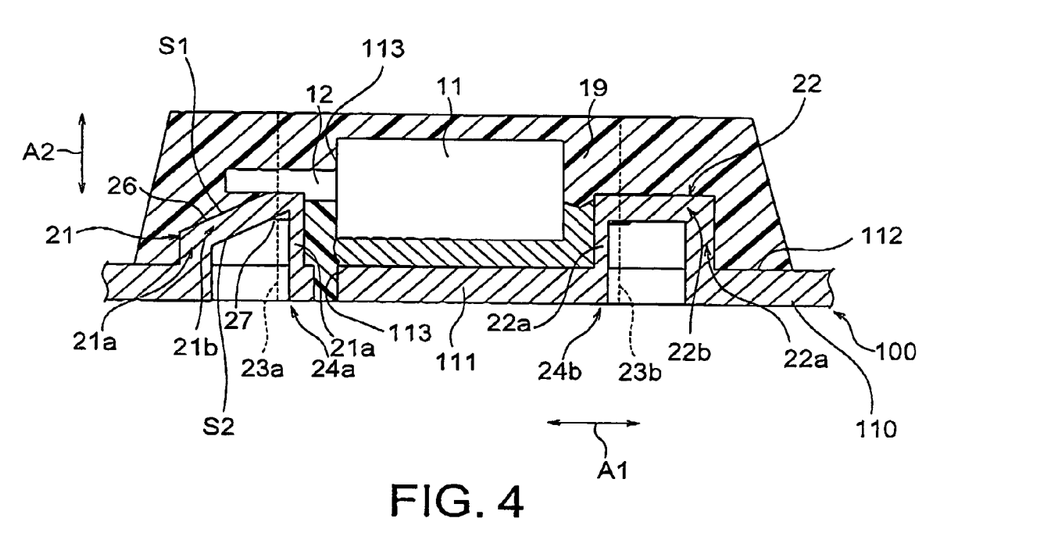
FIG. 4 is a sectional front view showing an intermediate stage of production of the capacitor illustrated in FIGS. 3A to 3C in the state where a capacitor element is bonded to a lead frame.

Referring to FIG. 4, the capacitor element 11 is bonded to a lead frame 100 for use in producing the face-down terminal solid electrolytic capacitor. The lead frame 100 and the capacitor element 11 are overmolded with the casing resin 19. Thus, the illustrated structure is in an intermediate stage of production before a cutting process.

The lead frame 100 has a basic structure for use in fabrication of a face-down terminal solid electrolytic capacitor having electrodes directly drawn out to a board mount side (a board is not illustrated in the figure). Specifically, the lead frame 100 comprises a frame body 110 extending in a first direction A1 as the longitudinal direction, an anode terminal forming portion 21 for forming the anode terminal 13, and a cathode terminal forming portion 22 for forming the cathode terminal 14. The anode terminal forming and the cathode terminal forming portions 21 and 22 are formed integral with the frame body 110 and spaced from each other in the first direction A1 on an upper surface or a principal surface 112 of the frame body 110. The frame body 110 comprises a connecting portion 111 extending from the cathode terminal forming potion 14 in the first direction A1 to a position near the anode terminal forming portion 13. More particularly, the connecting portion 111 extends from the cathode terminal forming potion 14 to the reference plane 17 or to the vicinity of the reference plane 17 along the above-mentioned connection range. The connecting portion 111 serves as a part of the cathode terminal 14 of the solid electrolytic capacitor.

As compared with the lead frame 200 according to the background technique, each of the anode terminal forming and the cathode terminal forming portions 21 and 22 is reduced in size in the first direction A1. Thus, this embodiment is different from the background technique in that the cathode terminal 14 formed at the cathode terminal forming portion 22 extends to a position near the anode terminal 13 formed at the anode terminal forming portion 21 and is exposed at the mount surface.

In the lead frame 100, an anode bonding portion includes the anode terminal forming portion 21 (thick-line region) for forming the anode terminal 13 and is continuous from the anode terminal forming portion 21 to ensure connection between the anode terminal 13 and the anode lead 12. The anode bonding portion is deformed by a drawing or coining (crushing) process in a direction perpendicular to the principal surface 112 and in a direction different therefrom, thereby forming an anode terminal deformation portion. In other words, the anode terminal forming portion 21 is formed as a deformation portion which is protruded from the principal surface 112 in a second direction A2 perpendicular to the principal surface 112. The deformation portion has a concave surface S1 and a convex surface S2 opposite to the concave surface S1. The deformation portion has a pair of perpendicular portions 21a extending in the second direction A2 with an anode-side cutting plane 23a interposed therebetween and a bridging portion 21b extending to connect the perpendicular portions 21a. The perpendicular portions 21a are plated and the bridging portion 21b is provided with a flat portion 27 that is parallel to the principal surface and serves as a welding margin and with an inclined portion 26 that is continuous from the flat portion 27 to be away from the cathode terminal forming portion 22 and inclined so as to approach the principal surface away from the flat portion 27. The inclined portion 26 may be formed by a crushing process. The reason why the anode bonding portion for forming the anode terminal forming portion 21 has the inclined portion 26 inclined to approach the principal surface as the bridging portion 21b is away from the flat portion 27 is as follows. With the above-mentioned structure, upon resistance welding with the anode lead 12, welding points are located inside a cut plane. By presence of the inclined portion 26, the welding points are concentrated to a target position.

Likewise, in the lead frame 100, a cathode bonding portion includes the cathode terminal forming portion 22 (thick line region) for forming the cathode terminal 14 and is continuous from the cathode terminal forming portion 2. The cathode bonding portion of the lead frame 100 is deformed by a drawing or a crushing process in the second direction A2 and in a direction different therefrom, thereby forming a cathode terminal deformation portion. The deformation portion has a concave surface S1 on the mount surface side and a convex surface S2 opposite to the mount surface (as a profile of the cathode bonding portion in the lead frame 100 as seen from the mount surface side and the side opposite to the mount surface, respectively). The deformation portion has a pair of perpendicular portions 22a extending in the second direction A2 with a cathode-side cutting plane 23b interposed therebetween and a bridging portion 22b extending in parallel to the mount surface and connecting the perpendicular portions 22a. If the deformation portion has a section, parallel to the principal surface 112, of a polygonal shape or a shape with at least one rectilinear side (generally, a polygonal shape having three or more angles), cutting for separating a chip body from the lead frame 100 is facilitated.

Figure 5A:
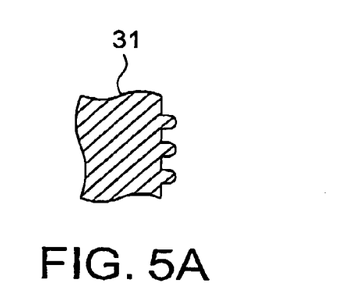
FIG. 5A is an enlarged sectional view showing projecting portions formed on a convex surface of an electrode bonding portion of the lead frame in FIG. 4.
Figure 5B:
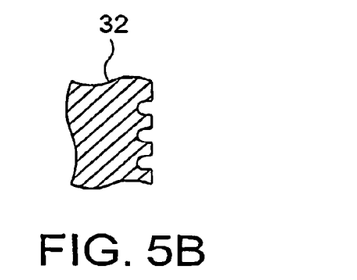
FIG. 5B is an enlarged sectional view showing recessed portions formed on the convex surface of the electrode bonding portion of the lead frame in FIG. 4.

Further, each of the bridging portions 21b and 22b may be provided with projecting portions 31 (FIG. 5A) or recessed portions 32 (FIG. 5B) which are formed on surfaces generally perpendicular to the principal surface 112. The projecting portions 31 or the recessed portions 32 extend in a third direction A3 (FIG. 3A) perpendicular to the first and the second directions A1 and A2 and are formed away from the principal surface. With this structure, the projecting portions 31 or the recessed portions 32 serve as anchors to the casing resin 19 so that the fixing strength is enhanced.

Further, the anode terminal forming portion 21 and the cathode terminal forming portion 22 are provided with films containing at least one of Ag, Au, Cu, Pd, and Sn in order to form the anode terminal 13 and the cathode terminal 14, respectively. Likewise, each of the anode terminal forming portion 21 and the cathode terminal forming portion 22 is provided, on its surfaces in the second direction A2, with films containing at least one of Ag, Au, Cu, Pd, and Sn in order to form the anode terminal 13 and the cathode terminal 14, respectively. With this structure, the bonding force with a solder or the like increases at the interface.

Figure 6:
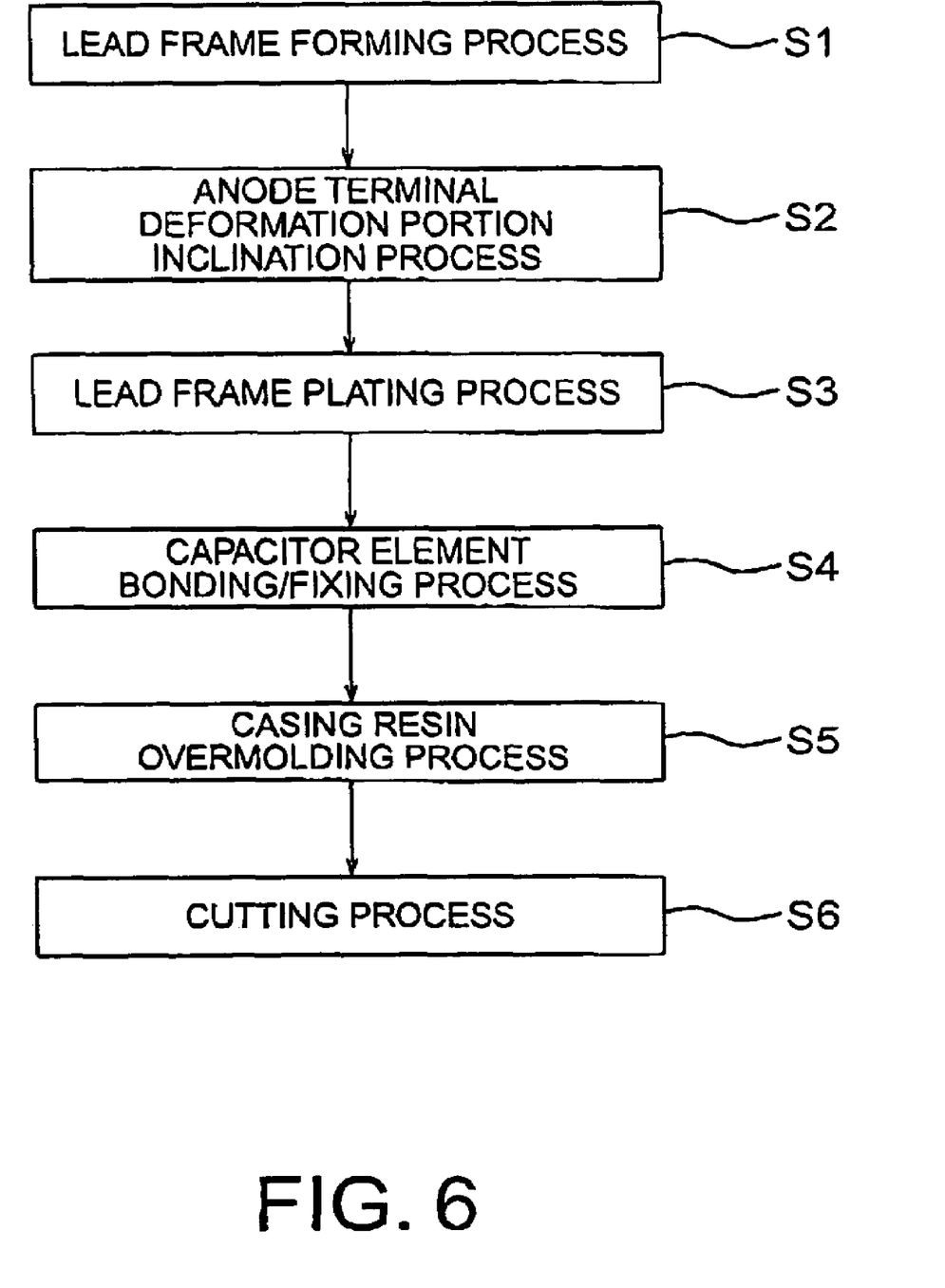
FIG. 6 is a flowchart for describing a manufacturing process of the facedown terminal solid electrolytic capacitor shown in FIGS. 3A to 3C.

Referring to FIG. 6, description will be made of a manufacturing process of the above-mentioned face-down terminal solid electrolytic capacitor. In the manner similar to that described in conjunction with the background technique, the lead frame 100 having a predetermined plate-frame shape is at first formed (step S1). As a separate component, the capacitor element 11 having the anode lead 12 is prepared.

The anode bonding portion of the lead frame 100 that includes the anode terminal forming portion 21 (thick-line region) for forming the anode terminal 13 and that is continuous from the anode terminal forming portion 21 to ensure connection between the anode terminal 13 and the anode lead 12 is deformed by a drawing or a crushing process in the second direction A2 and in a direction different therefrom. As a consequence, the anode terminal deformation portion is formed. The deformation portion has the concave, surface S1 on the mount surface side and the convex surface S2 opposite to the mount surface. The deformation portion has the perpendicular portions 21a extending in the second direction A2 with the anode-side cutting plane 23a interposed therebetween and the bridging portion 21b extending to connect the perpendicular portions 21a. In the formation of the deformation portion, the inclination processing of the anode terminal deformation portion (step S2; is carried out to provide the bridging portion 21b with the flat portion 27 that is parallel to the mount surface and serves as a welding margin and with the inclined portion 26 that is continuous from the flat portion 27 and inclined so as to approach the mount surface away from the flat portion 27. Further, in the manner similar to that described in conjunction with the background technique, the cathode bonding portion for providing the cathode terminal forming portion 22 for forming the cathode terminal 14 is deformed by a drawing or a crushing process in the second direction A2 and in a direction different therefrom, thereby forming the cathode terminal deformation portion The deformation portion has the concave surface on the mount surface side and the convex surface opposite to the mount surface. The deformation portion has the perpendicular portions 22a extending in the second direction A2 with the cathode-side cutting plane 23b interposed therebetween and the bridging portion 22b extending in parallel to the mount surface and connecting the perpendicular portions 22a. A combination of the inclination processing of the anode terminal deformation portion and the processing of the cathode terminal deformation portion may collectively be called deformation processing for electrode terminal formation.

Thereafter, the lead frame 100 is plated including the perpendicular portions 21a and 22a (step S3). Then, the capacitor element 11 is fixedly bonded to the lead frame 100 (step S4). Further, after overmolding with the casing resin 19 (step S5), the casing resin 19 and the lead frame 100 are cut along the anode-side cutting plane 23a and the cathode-side cutting plane 23b (located outside an anode-side fillet surface concave portion 24a and a cathode-side fillet surface concave portion 24b) (step S6).

Only in case where the drawing process is carried out in the inclination processing of the anode terminal deformation portion (step S2), plating may be carried out prior to formation of the perpendicular portions 21a and 22a. Specifically, the flat-shaped lead frame 100 is plated before the formation of the lead frame 100 (step S1) and the deformation processing for electrode terminal formation including the inclination processing of the anode terminal deformation portion (step S2).

It is noted here that the step of fixedly bonding the capacitor element 11 to the lead frame 100 (step S4) corresponds to the capacitor bonding step of bonding the capacitor element 11 to the lead frame 100 in the above-mentioned method of manufacturing a facedown terminal solid electrolytic capacitor. Further, the step of overmolding with the casing resin 19 (step S5) corresponds to the resin mold step of overmolding the capacitor element 11 and the lead frame 100 with the casing resin 19. In addition, the step of cutting (step S1) corresponds to the outer surface forming step of cutting the lead frame 100, the anode lead 12 of the capacitor element 11, and the casing resin 19 along one of plated surfaces of each of the perpendicular portions 21a and 22a while leaving the one of the plated surfaces, thereby forming an outer surface to serve as a side surface of a product. As described above, in the capacitor bonding step, it is preferable to apply an insulating resin to part of the anode terminal forming portion 21 before bonding the capacitor element 11 to the anode terminal forming portion 21.

In any event, in the state where the capacitor element 11 is bonded to the lead frame 100 and overmolded with the casing resin 19, the anode terminal forming portion 21 and the cathode terminal forming portion 22 are formed as shown in FIG. 4. By carrying out the cutting along the anode-side cutting, plane 23a and the cathode-side cutting plane 23b to obtain a chip body, the anode-side fillet surface concave portion 24a and the cathode-side fillet surface concave portion 24b serve as the fillet surfaces after the cutting. Herein, by providing the plated perpendicular portions 21a and 22a in the anode terminal forming portion 21 and the cathode terminal forming portion 22, the process of carrying out the plating after the cutting becomes unnecessary.

Summarizing, the facedown terminal solid electrolytic capacitor according to the embodiment is manufactured as follows. The lead frame 100 having a flat shape as an initial shape is produced. Then, with respect to: the anode terminal forming portion 21 and the cathode terminal forming portion 22, the perpendicular portions 21a and 22a and the bridging portions 21b and 22b connecting the perpendicular portions 21a and 22a are formed from a bottom side on the drawing sheet into the shapes shown in FIG. 4, respectively. The capacitor element 11 is bonded to the lead frame 100 as follows. On the anode side, the capacitor element 11 and the anode lead 12 are connected by laser welding or resistance welding. On the cathode side, the capacitor element 11 is connected by the use of the conductive adhesive 20 containing Ag. Then, after overmolding the casing resin 19 by transfer mold, cutting is carried out by the use of a dicing saw along two planes, i.e., the anode-side cutting plane 23a and the cathode-side cutting plane 23b corresponding to product side surfaces. Thus, the face-down terminal solid electrolytic capacitor according to the embodiment is obtained.

The capacitor element 11 may be fabricated by a known technique. Therefore, description will briefly be made of a case where tantalum is used as the valve-action metal. In order to fabricate the capacitor element 1, tantalum powder is at first formed by a press machine into a compact around a tantalum wire. The compact is then sintered in a high vacuum at a high temperature. Then, a $Ta_2O_5$ film is formed on the surface of the sintered compact of tantalum powder. The sintered compact with the $Ta_2O_5$ film is immersed or dipped in a manganese nitrate solution and is thereafter subjected to thermal decomposition to produce $MnO_2$. Subsequently, the cathode layer is formed by graphite and Ag. Thus, the capacitor element 11 is obtained. $MnO_2$ for the cathode layer may be replaced by a conductive high polymer such as polythiophene or polypyrrole. In this case, a low ESR can easily be obtained as the single capacitor element 11. Further, niobium, aluminum, titanium, or the like may be used as a valve-action metal instead of tantalum.

In any event, in case of the lead frame 100 described in the embodiment, the connection range for connecting the cathode terminal 14 and the capacitor element 11 to each other by the use of the conductive adhesive 20 (i.e., the position of the cathode terminal forming portion 22) extends from the cathode-side portion to the reference plane 17. The reference plane 17 is given by the connection end face of the capacitor element 11 where the anode lead 12 is embedded. The cathode terminal 14 is connected by the conductive adhesive 20 so as to be at least partly exposed at the mount surface in correspondence to the connection range extending from the cathode-side portion to the reference plane 17 or to the position near the reference plane 17 (i.e. the cathode terminal 14 extends to the reference plane 17 or the position near the anode terminal 13 and is exposed at the mount surface). Therefore, the current path between the anode and the cathode becomes short so that the ESR and the ESL of the entire capacitor decrease.

In addition, in the above-mentioned lead frame 100, a plating material having a low electrical resistance is selected taking into account that the plating serves as a current path due to the skin effect in the high frequency band. Further, in case where the anode terminal 13 and the cathode terminal 14 in the thickness direction as part of the current path between the anode and the cathode are cut in order to arrange the shape, cutting is carried out in the manner such that the plated surfaces remain at the perpendicular portions 21a and 22a of the electrode terminal forming portions (the anode terminal forming portion 21 and the cathode terminal forming portion 22). Thus, the ESL can be reduced. Accordingly, in addition to shortening the current path between the anode and the cathode, the reduction in ESL is sufficiently achieved. Therefore, according to the method of producing a face-down terminal solid electrolytic capacitor using the lead frame 100, it is possible to provide, with high productivity, the facedown terminal solid electrolytic capacitor in which the ESR and the ESL of the entire capacitor are reduced and the reliability is excellent.

The face-down terminal solid electrolytic capacitor including the lead frame 100 according to the foregoing embodiment is no more than a mere example, and various changes or modifications may be made to detailed structures of the respective portions by design changes. Therefore, the lead frame of this invention, the method of producing a face-down terminal solid electrolytic capacitor using the lead frame, and the face-down terminal solid electrolytic capacitor manufactured by the method are not limited to those disclosed in the embodiment.

What is claimed is:

1. A lead frame for use in fabricating a facedown terminal solid electrolytic capacitor having a capacitor element, an anode terminal, and a cathode terminal, said lead frame comprising:

a frame body extending in a first direction;

an anode terminal forming portion connected to said frame body for forming said anode terminal; and a cathode terminal forming portion connected to said frame body for forming said cathode terminal, wherein said anode terminal forming portion and said cathode terminal forming portion are spaced from each other in said first direction on a principal surface of said frame body, wherein said frame body comprises a connecting portion for being connected to said capacitor element, said connecting portion extending from said cathode terminal forming portion in said first direction to a position near said anode terminal forming portion, and wherein said anode terminal forming portion is formed as a deformation portion which is protruded from said principal surface in a second direction perpendicular to said principal surface to have a concave surface and a convex surface opposite to said concave surface.

2. The lead frame according to claim 1, wherein said connecting portion defines a connection range to be electrically connected to said capacitor element that is placed between said anode terminal forming portion and said cathode terminal forming portion.

3. The lead frame according to claim 2, wherein said solid electrolytic capacitor has a connection end face and an anode lead led out from said connection end face, said anode terminal forming portion being adapted to be connected to said anode lead.

4. The lead frame according to claim 3, wherein said connecting portion extends from said cathode terminal forming portion to a position near a reference plane which is along said connection end face.

5. The lead frame according to claim 3, wherein said connection range extends from said cathode terminal forming portion to a reference plane which is along said connection end face.

6. The lead frame according to claim 1, wherein said concave surface is plated.

7. The lead frame according to claim 1, wherein said convex surface comprises:
a flat portion parallel to said principal surface; and
an inclined portion continuous from said flat portion to be away from said cathode terminal forming portion in the first direction, said inclined portion being inclined so as to approach said principal surface.

8. The lead frame according to claim 7, wherein said deformation portion has a projecting portion formed away from said principal surface and outwardly extending in a third direction perpendicular to said first and said second directions.

9. The lead frame according to claim 7, wherein said deformation portion has a recessed portion formed away from said principal surface and inwardly extending in a third direction perpendicular to said first and said second directions.

10. The lead frame according to claim 1, wherein said deformation portion is formed by a drawing or a reducing process.

11. The lead frame according to claim 1, wherein said deformation portion is formed by a coining process.

12. The lead frame according to claim 1, wherein said concave surface has a polygonal shape in a section parallel to said principal surface.

13. The lead frame according to claim 1, wherein said concave surface comprises at least one rectilinear side in a section parallel to said principal surface.

14. The lead frame according to claim 1, wherein each of said anode terminal forming and said cathode terminal forming portions is provided with a film containing at least one of Ag, Au, Cu, Pd, and Sn.

15. The lead frame according to claim 1, wherein each of said anode terminal forming portion and said cathode terminal forming portion is provided, on surfaces thereof in a direction perpendicular to said principal surface, with a film containing at least one of Ag, Au, Cu, Pd, and Sn in order to form said anode terminal and said cathode terminal, respectively.

16. A method of manufacturing a face-down terminal solid electrolytic capacitor, said method comprising:

preparing lead frame which comprises a frame body extending in a first direction, an anode terminal forming portion connected to said frame body for forming an anode terminal, and a cathode terminal forming portion connected to said frame body for forming a cathode terminal, wherein said anode terminal forming portion and said cathode terminal forming portion are spaced from each other in said first direction on a principal surface of said frame body, wherein said frame body comprises a capacitor element connecting portion that extends from said cathode terminal forming portion in said first direction to a position near said anode terminal forming portion, and wherein said anode terminal forming portion is formed as a deformation portion which is protruded from said principal surface in a second direction perpendicular to said principal surface to have a concave surface and a convex surface opposite to said concave surface;

preparing a capacitor element having an anode lead;

bonding said capacitor element to said lead frame;

overmolding said capacitor element and said lead frame with a casing resin; and cutting said lead frame, said anode lead, and said casing resin, thereby forming an outer surface to serve as a side surface of said solid electrolytic capacitor.

17. The method according to claim 16, wherein the anode terminal forming portion and the cathode terminal forming portion of the lead frame have plated surfaces, and the cutting is carried out along one of the plated surfaces while leaving said one of plated surfaces.

18. The method according to claim 16, further comprising applying, before the bonding, an insulating resin to a part of said anode terminal forming portion.

19. A face-down terminal solid electrolytic capacitor manufactured by the method according to claim 16, wherein:

said capacitor element comprises a dielectric layer, an electrolyte layer, and a cathode layer successively formed on a surface of a porous sintered body made of a valve-action metal and having said anode lead drawn out therefrom;

said anode terminal is formed at said anode terminal forming portion having a first end connected to said anode lead and a second end serving as an external connection terminal;

said cathode terminal is formed at said cathode terminal forming portion having a first end connected to said cathode layer of said capacitor element and a second end serving as an external connection terminal;

said casing resin covers said capacitor element and is arranged so that each of said anode terminal and said cathode terminal has exposed surfaces on a mount surface with respect to a board and an outer side surface substantially perpendicular to said mount surface.

20. A lead frame for use in fabricating a facedown terminal solid electrolytic capacitor having a capacitor element, an anode terminal, and a cathode terminal, said lead frame comprising:

a frame body extending in a first direction;

an anode terminal forming portion connected to said frame body for forming said anode terminal; and a cathode terminal forming portion connected to said frame body for forming said cathode terminal, wherein said anode terminal forming portion and said cathode terminal forming portion are spaced from each other in said first direction on a principal surface of said frame body, wherein said frame body comprises a connecting portion for being connected to said capacitor element; and wherein said connecting portion extends from said cathode terminal forming portion to a reference plane which is defined by a connection end face of said capacitor element.

* * * * *